United States Patent
Mallet et al.

(10) Patent No.: US 8,412,436 B2
(45) Date of Patent: Apr. 2, 2013

(54) HILL START ASSISTANCE METHOD FOR MOTOR VEHICLES

(75) Inventors: Mickael Mallet, Montigny-le Bretonneux (FR); Richard Pothin, Jouars-Pontchartrain (FR)

(73) Assignee: Renault S.A.S., Boulogne Billancourt (FR)

( * ) Notice: Subject to any disclaimer, the term of this patent is extended or adjusted under 35 U.S.C. 154(b) by 583 days.

(21) Appl. No.: 12/596,099

(22) PCT Filed: Apr. 2, 2008

(86) PCT No.: PCT/FR2008/050582
§ 371 (c)(1),
(2), (4) Date: Feb. 2, 2010

(87) PCT Pub. No.: WO2008/139090
PCT Pub. Date: Nov. 20, 2008

(65) Prior Publication Data
US 2010/0138129 A1 Jun. 3, 2010

(30) Foreign Application Priority Data
Apr. 19, 2007 (FR) ...................... 0754563

(51) Int. Cl.
*B60T 7/12* (2006.01)
(52) U.S. Cl. ............... 701/83; 701/36; 701/48; 701/67; 701/70; 303/112; 303/191
(58) Field of Classification Search .............. 701/36, 701/48, 67, 70, 83; 303/112, 141, 145, 155, 303/157, 158, 191, 193; 477/92, 194, 195, 477/197
See application file for complete search history.

(56) References Cited

U.S. PATENT DOCUMENTS

| | | | | |
|---|---|---|---|---|
| 4,615,419 A | * | 10/1986 | Gaiser | 188/181 T |
| 5,101,945 A | * | 4/1992 | Scott | 192/13 R |
| 5,820,515 A | * | 10/1998 | Fukaya et al. | 477/92 |
| 6,260,934 B1 | * | 7/2001 | Lee | 303/192 |
| 6,411,881 B1 | * | 6/2002 | Thomas | 701/67 |
| 6,439,675 B1 | * | 8/2002 | Zechmann et al. | 303/191 |
| 7,041,031 B2 | * | 5/2006 | Wheeler et al. | 477/110 |

(Continued)

FOREIGN PATENT DOCUMENTS

| | | |
|---|---|---|
| DE | 199 50 034 | 4/2001 |
| DE | 199 50 162 | 5/2001 |

(Continued)

*Primary Examiner* — Khoi Tran
*Assistant Examiner* — Jonathan L Sample
(74) *Attorney, Agent, or Firm* — Oblon, Spivak, McClelland, Maier & Neustadt, L.L.P.

(57) ABSTRACT

A hill start assistance method for a user of a vehicle having a braking system and an electronic braking control, provided with at least one master cylinder pressure sensor, whereby the pressure on each caliper of the vehicle can be controlled. The method includes: estimating the torque transmitted by the clutch, recording information corresponding to the value of the master cylinder pressure resulting from a user's actuation of the brake pedal, and recording the information recorded corresponding to the value of the master cylinder pressure when the user actuates the brake pedal again by pressing harder on the pedal or partially releasing same. When the user releases the brake pedal fully, the braking system maintains the pressure on the calipers for a predetermined period of time, as a function of a pressure set value equal to the value of the last item of information recorded.

9 Claims, 2 Drawing Sheets

U.S. PATENT DOCUMENTS

| | | | |
|---|---|---|---|
| 7,226,389 B2* | 6/2007 | Steen et al. | 477/195 |
| 7,494,443 B2* | 2/2009 | Kamikado | 477/194 |
| 2003/0214186 A1 | 11/2003 | Kinder et al. | |
| 2005/0004732 A1* | 1/2005 | Berry et al. | 701/48 |
| 2005/0067896 A1* | 3/2005 | Kim et al. | 303/191 |
| 2006/0079377 A1* | 4/2006 | Steen et al. | 477/186 |
| 2006/0131957 A1 | 6/2006 | Kinder et al. | |
| 2006/0170284 A1* | 8/2006 | Alvarez et al. | 303/191 |
| 2007/0164607 A1* | 7/2007 | Itoh | 303/155 |
| 2008/0153669 A1* | 6/2008 | Peterson | 477/197 |
| 2008/0234909 A1* | 9/2008 | Iwasaki et al. | 701/70 |
| 2009/0216416 A1* | 8/2009 | Nanri et al. | 701/70 |
| 2010/0174465 A1* | 7/2010 | Gibson et al. | 701/70 |

FOREIGN PATENT DOCUMENTS

| | | |
|---|---|---|
| DE | 100 63 061 | 6/2002 |
| DE | 10 2005 011 032 | 12/2005 |
| DE | 10 2004 045 434 | 3/2006 |

* cited by examiner

HILL START ASSISTANCE METHOD FOR MOTOR VEHICLES

BACKGROUND

The present invention relates to a hill start assistance device for a vehicle.

It relates more specifically to a hill start assistance device for a motor vehicle with a manual gearbox, based on a hydraulic braking circuit.

In present-day vehicles, hill starts (or pulling away on a hill) are a source of stress for the user of the vehicle who is trying his best to limit how far his vehicle rolls back.

In general, he has to transfer his foot as quickly as possible from the brake pedal to the accelerator pedal so that the vehicle does not have time to roll down the slope.

Solutions for avoiding this source of stress are known.

Document DE 102 42 122 proposes a method in which brake release is performed as a function of the torque transmitted to the clutch. For that, the method initially determines the longitudinal force exerted on the wheels and the inertia force exerted on the vehicle when the latter is stationary, and then, having estimated the engine torque, deduces the instantaneous torque transmitted to the clutch. If the transmitted torque thus calculated is high enough to compensate for the longitudinal force due to the slope, then the device releases the brakes.

This method does, however, have the disadvantage of being sensitive to clutch wear and aging.

Document EP 1 410 940 for its part proposes a method in which the braking is electrically controlled in order to maintain a demanded pressure on the wheel calipers, without the operator having to operate the brake pedal, so as to prevent the vehicle from moving, this being done until such time as the clutch pedal crosses a set threshold.

Document DE 196 21 628 discloses a device in which, when the brake pedal is first of all actuated, with the vehicle immobilized, a braking force is maintained at at least one wheel of the vehicle independently of the actuating travel of the pedal. When the brake pedal is then released, the braking force is reduced at said at least one wheel, allowing for a smooth start. To implement this method, the electrically operated valves of the braking system are controlled directly by the device.

Finally, document WO 2004/103785 describes a hill start assistance method in which a pitch sensor is used to deactivate a function that holds the vehicle on a hill, of the type commonly known by its English name of "hill-holder". The vehicle is held in position until such time as set pull-away conditions have been satisfied, and until such time as a pitch change threshold is crossed.

However, the measurement of the pitch angle is highly sensitive to noise, due, for example, to movements of the passengers inside the vehicle. Furthermore, the pitch angle sensor has a high response time, making optimal brake release during pull-away difficult.

BRIEF SUMMARY

In order to avoid the source of stress connected with hill starts, it is therefore an object of the invention to propose a novel method for improving the hill start assistance function of a vehicle (the English abbreviation HSA which stands for "Hill Start Assistant" is commonly used).

Another object of the invention is to propose a hill start assistance method in which the moment of brake release is optimal, so that the vehicle is released without rolling back and without being held back.

It is another object of the invention to propose a hill start assistance method that has improved dependability, without any unwanted braking.

A final objective of the invention is to propose a hill start assistance method that is hardly sensitive to clutch aging, wear and manufacturing spread.

To do that, the invention proposes a hill start assistance method to assist a user in maneuvering his vehicle on a hill, comprising a braking system and an electronic brake control, equipped with at least one master cylinder pressure sensor and in which the pressure on each caliper of the vehicle can be controlled, the method comprising the steps consisting in:
  (a) estimating the torque transmitted by the clutch,
  (b) recording an item of information corresponding to the value of the master cylinder pressure resulting from user actuation of the brake pedal,
  (c) updating the recorded information corresponding to the value of the master cylinder pressure when the user re-actuates the brake pedal by depressing it further or by partially releasing it,
characterized in that when the user completely releases the brake pedal, the braking system, for a set period of time, maintains the pressure on the calipers as a function of a pressure setpoint equal to the value of the last recorded piece of information.

Certain preferred but nonlimiting aspects of the method according to the invention are as follows:
  the set period of time is equal to the shortest period of time between:
    the timed period defined by the system,
    the time needed for set pull-away conditions to be simultaneously met,
  one pull-away condition is that a gear ratio be engaged,
  one pull-away condition is that the torque transmitted by the clutch be greater than the threshold pull-away torque,
  one pull-away condition is that the gear ratio engaged be consistent with the gradient,
  the rate of brake release can be parametrized,
  the braking system is a hydraulic unit of the ESP (this abbreviation for the English expression "electronic stability program" is commonly used for dynamic stability control) type.

According to a second aspect of the invention, there is proposed a hill start assistance device for a vehicle, comprising:
  a braking system powered by an external force and an electronic brake control, equipped with at least one master cylinder pressure sensor, it being possible for the pressure on each caliper of the vehicle to be controlled,
  means for estimating the torque transmitted to the clutch,
  means for recording the value of the master cylinder pressure resulting from user actuation of the brake pedal and, as appropriate, updating the recorded master cylinder pressure value,
characterized in that, when the user completely releases the brake pedal, the device, for a set period of time, maintains the pressure on the calipers as a function of a pressure setpoint equal to the maximum recorded value of the master cylinder pressure.

Certain preferred but nonlimiting aspects of the device according to the invention are as follows:

it influences the pressure on the calipers only when this pressure is lower than the master cylinder pressure recorded by the recording means during a method according to the invention.

The invention also proposes a vehicle comprising a braking system and an electronic brake control, equipped with at least one master cylinder pressure sensor, it being possible for the pressure on each caliper of the vehicle to be controlled, characterized in that it comprises an assistance device according to the invention.

BRIEF DESCRIPTION OF THE DRAWINGS

Further features, objects and advantages of the present invention will emerge from reading the detailed description which will follow, with reference to the attached drawings, given by way of nonlimiting examples, and in which.

DETAILED DESCRIPTION

Figure 1:
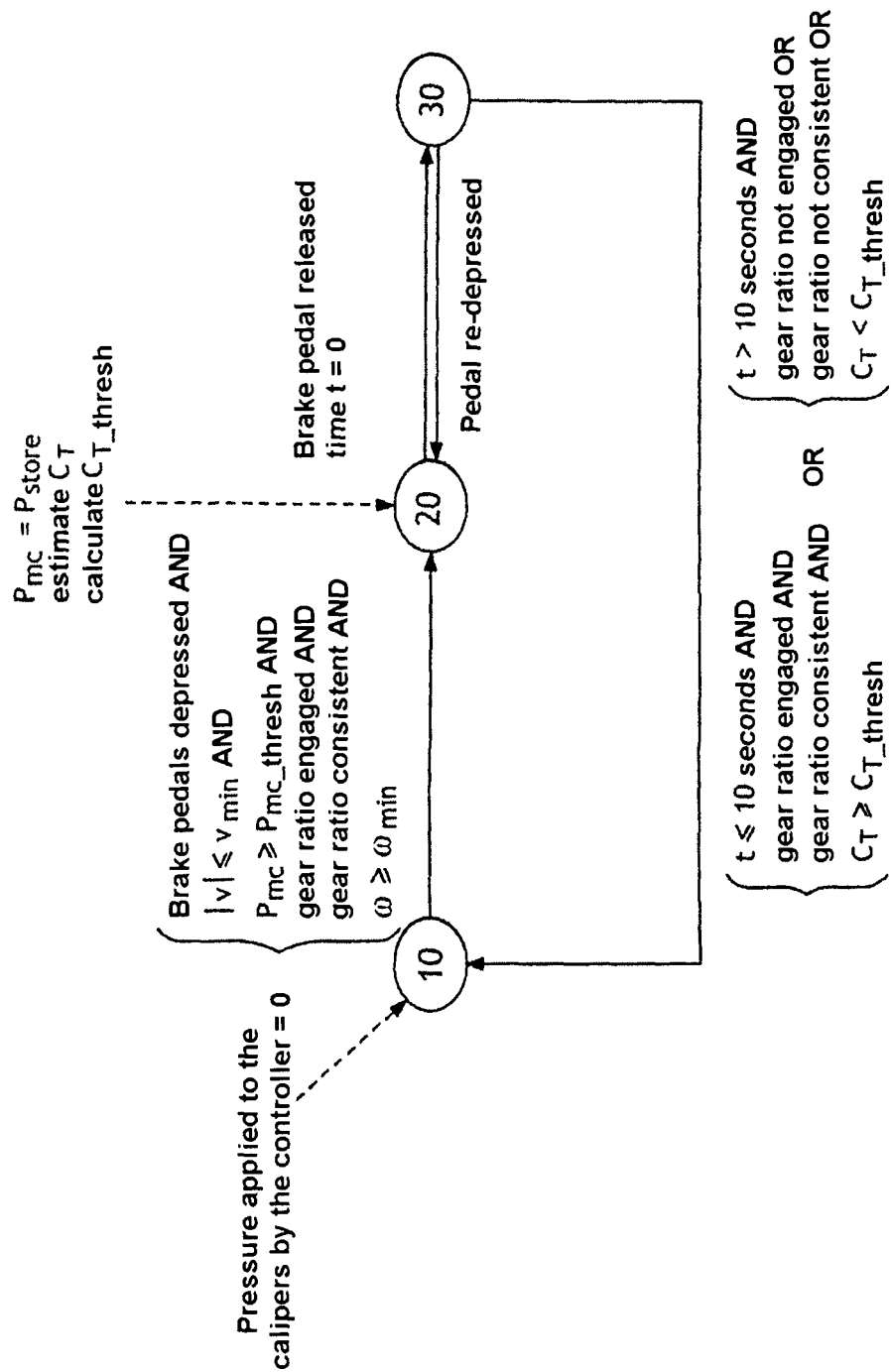
FIG. 1 shows a controller of the HSA function according to the invention.

A vehicle equipped with a hill start assistance device employing the method according to the invention comprises a power plant, an automatic parking brake 5, a bus 4, which carries signals from the rest of the vehicle 6, and a power plant management computer. The bus 4 is preferably a bus to the CAN™ standard (this acronym which stands for the English "Control Area Network" is commonly used for a control area network). The power plant is made up of a combustion engine coupled to driven wheels by a transmission device comprising a gearbox and a clutch, which are controlled by the user through a clutch pedal. In other embodiments, the power plant may comprise one or more electrical machines, with or without a combustion engine.

The hill start assistance device collaborates with a computer 1 that controls the automatic parking brake 5, and which is also connected to the bus 4. The computer 1 is equipped, as is known, with a means for producing orders to apply and release the automatic parking brake 5, said orders for the brake 5 being generated on a connecting line leading to the automatic parking brake 5 proper.

If appropriate, the computer 1 is also equipped with a means for transmitting to the bus 4 items of information regarding the state of the automatic parking brake 5.

The computer 1 that controls the automatic parking brake 5 is connected by an appropriate line to a gradient sensor 2. When the vehicle is stationary on a slope, the gradient sensor 2 delivers a signal representative of the gradient of the slope on which the vehicle is stationary.

When the computer 1 that controls the automatic parking brake 5 produces an order to apply the brakes, the moving parts of the brakes are clamped against the disks so that the automatic parking brake 5 is applied.

Conversely, when the computer 1 that controls the automatic parking brake 5 produces an order to release the automatic parking brake 5, the moving parts of the brakes are released.

Furthermore, in a start situation (irrespective of the gradient of the slope), the power plant of the vehicle produces a torque which may or may not be transmitted to the wheels, depending on whether or not the clutch is engaged, and in a proportion which is dependent on the angular position of the clutch pedal.

The method according to the invention is based on an estimate of the torque $C_T$ transmitted by the clutch, this estimate being obtained from the clutch friction curve, which expresses the transmitted torque $C_T$ as a function of the angular position $\theta_{clutch}$ of the clutch pedal.

In order to pull away, a vehicle parked on a slope has to overcome the effect of the slope, which is due to the Earth's gravitational pull.

This effect is a function of the gradient of the slope and of the mass of the vehicle, and has the value $$m \cdot g \cdot \sin(\theta_{slope})$$

where
  m is mass of the vehicle,
  g is gravity,
  $\theta_{slope}$ is the gradient of the slope.

The minimum torque $C_{T\_thresh}$ that has to be transmitted to the clutch via the wheel drive line in order to allow the vehicle to pull away (that is to say to start on the slope) therefore has to be at least equal to $$C_{T\_thresh} = m \cdot g \cdot \sin(\theta_{slope}) \cdot r(b) \cdot \rho_{wheels}$$

where
  r(b) is the gear ratio engaged, corresponding to the position b of the gear lever,
  $\rho_{wheels}$ is the radius, under load, of the wheels of the vehicle.

This torque $C_{T\_thresh}$ is the threshold pulling-away torque. It therefore adopts the value:
  0 if the recorded gradient characteristic ($\theta_{slope\_store}$) is positive or zero and reverse gear is engaged, or if the recorded gradient ($\theta_{slope\_store}$) is negative or zero and a forward gear is engaged,
  $m \cdot g \cdot \sin(\theta_{slope}) \cdot r(b) \cdot \rho$wheels if the recorded gradient characteristic ($\theta_{slope\_store}$) is strictly positive and a forward gear is engaged, or if the recorded gradient ($\theta_{slope\_store}$) is strictly negative and reverse gear is engaged.

This definition of the threshold pull-away torque $C_{T\_thresh}$ therefore makes it possible to set said threshold torque $C_{T\_thresh}$ to zero when the user is starting in the downward direction of the slope. The strategy that the invention is proposing is based on the use of this relationship.

In particular, it consists in releasing the automatic parking brake in the phase of starting from stationary, when the torque $C_T$ transmitted to the clutch is greater than the threshold pull-away torque $C_{T\_thresh}$.

Figure 2:
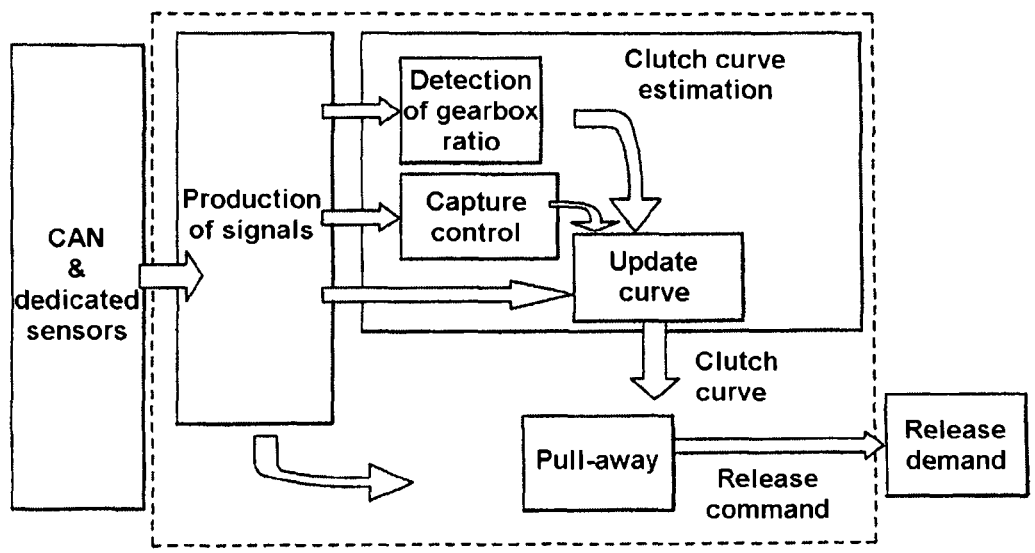
FIG. 2 illustrates the principle of operation of the controller which estimates the torque transmitted to the wheels of a vehicle employed in the invention, FIG. 3 sets out the functional architecture of a vehicle in which the method according to the invention is implemented.
Figure 3:
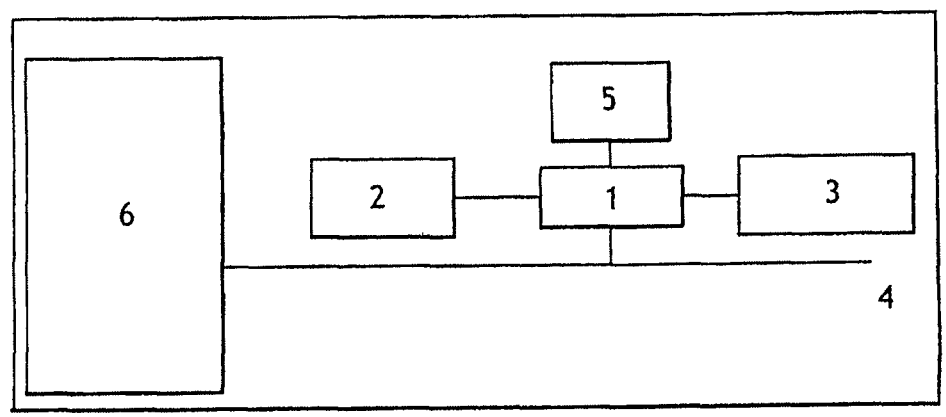

It is assumed here that the transmitted torque $C_T$ is estimated by a controller like the one described in French patent application FR 2 828 450 (illustrated by the attached FIG. 2, and which will not be described further in the remainder of the description).

The solution proposed by the invention is a controller of the HSA function, which is based on estimating the torque $C_T$ transmitted by the clutch, and implements a braking system and an electronic brake control, equipped with at least one master cylinder pressure sensor which influences the pressure at each caliper.

For preference, the braking system is a hydraulic braking unit of the conventional ESP type (this abbreviation for the English expression "Electronic Stability Program" is commonly used for dynamic stability control).

The detailed operation of the invention will now be described.

The operating algorithm for the HSA function controller can be broken down into three elements: the controller inputs and outputs, generation of the pull-away signal, and generation of the brake pressure setpoints.

Suitable means provide the controller, at input, with:
- a measurement of the gradient of the slope $\theta_{slope}$ (determined by a gradient sensor 2),
- a measurement of the angular position of the accelerator pedal $\theta_{acc}$ (determined by a sensor that measures the extent to which the accelerator pedal is depressed),
- a measurement of the angular position of the clutch pedal $\theta_{clutch}$ (determined by a sensor that measures the extent to which the clutch pedal is depressed),
- a measurement of the master cylinder pressure $P_{mc}$, by means of pressure sensors, making it possible to determine whether or not the user wishes to keep the vehicle stationary,
- information regarding the type of gear ratio engaged (forward, gear ratio engaged, reverse, neutral),
- a measurement of the vehicle speed v,
- a measurement of the rotational speed $\omega$ of the engine, indicating the autonomy of the running engine,
- an estimate of the transmitted torque $C_T$ learnt from the clutch map (obtained using the method described in French patent application FR 2 828 450, from the gradient of the slope $\theta_{slope}$, the angular position of the accelerator pedal $\theta_{acc}$ and the angular position of the clutch pedal $\theta_{clutch}$ and the mass m of the vehicle).

Determining the transmission ratio and the position of the gear lever (which provides information regarding the type of gear ratio engaged) allow the sensitivity of the assistance method to be adjusted to suit the user's intent, and determine for example whether the user wishes to start using gear ratios other than first gear.

The operation of the controller is illustrated on the attached FIG. 1.

The controller remains inactive, in an initial state 10 (in which either the vehicle is driving along, or it is stationary with the engine switched off), until such time as activation conditions are simultaneously met.

These conditions are:
- the vehicle speed v is lower than a minimum speed $v_{min}$,
- the master cylinder pressure $P_{mc}$ is higher than a threshold master cylinder pressure $P_{mc\_thresh}$,
- a gear ratio is engaged,
- the rotational speed of the engine $\omega$ is greater than a minimum rotational speed $\omega_{min}$,
- the gear ratio engaged is consistent with the slope (the user needs to have to wish to climb the slope, whether in a forward gear or in reverse).

The controller then switches to a second state 20, in which it estimates the torque $C_T$ transmitted by the clutch and stores in memory, using recording means, a piece of information $P_{store}$ corresponding to the value of the setpoint master cylinder pressure $P_{mc}$.

If the user of the vehicle re-actuates the brake pedal, the recording means updates the value of the information $P_{store}$ regarding the maximum master cylinder pressure applied by the user.

When the user completely releases the brake pedal, the controller switches to a third state 30.

The value of the theoretically applied setpoint master cylinder pressure $P_{mc}$ decreases, and then becomes lower than the value of the stored pressure information $P_{store}$.

However, the controller commands the master cylinder to maintain the control pressure at a value equal to $P_{store}$ store and automatically starts a timer.

However, for safety reasons, this automatic maintaining of pressure can be achieved for only a set length of time, for example 10 seconds.

If, at the end of the timed period, the pull-away conditions are not simultaneously met, the controller commands release of the pressure at the calipers and returns to the initial state 10.

If the pull-away conditions are simultaneously met before the timed period has elapsed, the controller commands release of the pressure, and the pressure applied to the calipers is therefore decreased at a parametrizable rate until it becomes zero, so that the vehicle performs a smooth hill start. The controller then returns to the initial state 10, in which it is once again inactive.

If the user depresses the brake pedal again before the end of the timed period, the controller returns to state 20, and the recording means re-updates the pressure value $P_{store}$ it has in memory, assigning it a value equal to the new maximum pressure $P_{mc}$ applied by the user.

A corresponding pressure is then applied to the calipers on the strength of this new setpoint.

There are at least three pull-away conditions. In particular, it is necessary that:
- a gear ratio be engaged,
- the gear ratio be consistent with the slope: it is necessary that a gear be engaged if the user wishes to perform a hill start in a forward gear, and for reverse gear to be engaged if the user is performing a hill start in reverse.
- the torque $C_T$ transmitted by the clutch be higher than the threshold pull-away torque $C_{T\_thresh}$ of the vehicle.

One advantage of the use of a hydraulic circuit is that it makes it possible to guarantee, outside of ABS operation (ABS is not involved in hill starts), that the pressure applied at the calipers is at least equal to the master cylinder pressure $P_{mc}$.

Specifically, the pressure at the calipers is influenced by the HSA function only when the master cylinder pressure $P_{mc}$ is lower than the recorded pressure $P_{store}$, making it possible to avoid any unwanted braking which could lead to safety issues.

Nonetheless, the HSA function influences the pressure at the calipers only if the master cylinder pressure value $P_{mc}$ is lower than the recorded value of the information $P_{store}$, thanks to the closing of electrically operated valves known as isolating valves.

Furthermore, the rates at which the brakes are released can be parametrized and vary according to the brake release conditions. For example, when the controller releases the brakes when the pull-away conditions have not been simultaneously met before the end of the timed period (in the case of the first variant), the rate of brake release is lower than when the controller is effecting a hill start. Further, this progression in the release of the brakes also allows the user to pull away more smoothly.

Finally, the fact that the measurement of the torque $C_T$ transmitted by the clutch is based not on a calculation, for example from engine torque, but on the estimate of the transmitted torque through learning of the clutch map, makes it possible to obtain a method and a device which are hardly sensitive to clutch aging, wear and manufacturing spread.

Of course, the present invention is not in any way restricted to the embodiments described hereinabove and the person skilled in the art will know how to make comprehensive variations or modifications thereto.

The invention claimed is:

1. A hill start assistance method to assist a user in maneuvering a vehicle on a hill, the vehicle includes a braking system and an electronic brake control, including at least one master cylinder pressure sensor and in which the pressure on each caliper of the vehicle can be controlled, the method comprising:

estimating torque transmitted by a clutch of the vehicle;

recording an item of information corresponding to a value of the master cylinder pressure resulting from user actuation of a brake pedal of the vehicle;

when the user completely releases the brake pedal, starting a timer to count for a set period of time during which the braking system maintains the pressure on the calipers as a function of a pressure setpoint equal to the value of the last recorded piece of information; and during the set period of time, commanding a release of the pressure on the calipers when pull-away conditions are not met by an end of the set period of time;

commanding a release of the pressure on the calipers when the pull-away conditions are met during the set period of time; and updating the recorded information with a new value of the master cylinder pressure when the user depresses the brake pedal again before the end of the set period of time, wherein the updating the recorded information includes stopping the timer and re-estimating the torque transmitted by the clutch.

2. The method as claimed in claim 1, wherein the set period of time is equal to a shortest period of time between:

a timed period defined by the system, a time needed for pull-away conditions to be simultaneously met.

3. The method as claimed in claim 2, wherein one of the pull-away conditions is that a gear ratio be engaged.

4. The method as claimed in claim 2, wherein one of the pull-away conditions is that the torque transmitted by the clutch be greater than a threshold pull-away torque.

5. The method as claimed in claim 3, wherein one of the pull-away conditions is that the gear ratio engaged be consistent with a gradient of the hill.

6. The method as claimed in claim 1, wherein a rate of brake release can be parametrized.

7. The method as claimed in claim 1, wherein the braking system is a hydraulic unit of ESP (electronic stability program) type.

8. A hill start assistance device for a vehicle, comprising:

an electronic brake control;

a braking system powered by an external force and the electronic brake control, including at least one master cylinder pressure sensor, pressure on each caliper of the vehicle being controlled by the electronic brake control;

means for estimating torque transmitted to a clutch of the vehicle; and means for recording a value of the master cylinder pressure resulting from user actuation of a brake pedal of the vehicle, wherein when the user completely releases the brake pedal, the device starts a timer to count for a set period of time during which the braking system maintains the pressure on the calipers as a function of a pressure setpoint equal to the maximum recorded value of the master cylinder pressure, wherein during the set period of time, the electronic brake control commands a release of the pressure on the calipers when the pull-away conditions are not met by an end of the set period of time;

the electronic brake control commands a release of the pressure on the calipers when the pull-away conditions are met during the set period of time; and the means for recording updates the recorded information with a new value of the master cylinder pressure when the user depresses the brake pedal again before the end of the set period of time, and wherein, when the means for recording updates the recorded information with the new value of the master cylinder pressure, the device stops the timer and the means for estimating re-estimates the torque transmitted by the clutch.

9. The assistance device as claimed in claim 8, wherein the electronic brake control influences the pressure on the calipers only when this pressure is lower than the master cylinder pressure recorded by the means for recording.

* * * * *